United States Patent [19]

Fleming et al.

[11] Patent Number: 5,544,918

[45] Date of Patent: Aug. 13, 1996

[54] SEAT BELT WEBBING ENERGY MANAGEMENT DEVICE

[75] Inventors: William J. Fleming, Rochester Hills; Charles E. Steffens, Jr., Washington, both of Mich.

[73] Assignee: TRW Vehicle Safety Systems Inc., Lyndhurst, Ohio

[21] Appl. No.: 335,894

[22] Filed: Nov. 8, 1994

[51] Int. Cl.⁶ .................................................. B60R 22/28
[52] U.S. Cl. ........................... 280/805; 188/377; 297/472
[58] Field of Search .................... 280/805, 806, 280/807, 753, 784; 297/470, 471, 472; 188/371, 377

[56] References Cited

U.S. PATENT DOCUMENTS

| | | | |
|---|---|---|---|
| 3,198,288 | 8/1965 | Presunka | 297/472 |
| 3,486,791 | 12/1969 | Stoffel et al. | 188/371 |
| 3,532,380 | 10/1970 | Studer et al. | |
| 3,552,525 | 1/1971 | Schudel | 188/377 |
| 3,790,208 | 2/1974 | Komatsu et al. | |
| 3,811,702 | 5/1974 | Kurasawa et al. | 297/470 |
| 3,834,482 | 9/1974 | Wada et al. | 280/752 |
| 3,862,673 | 1/1975 | Benson | |
| 4,029,350 | 6/1977 | Groupy et al. | 188/377 |
| 4,129,321 | 12/1978 | Garvey | 297/472 |
| 5,195,777 | 3/1993 | Cuevas | |
| 5,211,694 | 5/1993 | Sakakida et al. | 280/807 |
| 5,431,447 | 7/1995 | Bauer | 280/805 |

FOREIGN PATENT DOCUMENTS 3833543  5/1989  Germany .

OTHER PUBLICATIONS

HEXCEL, "Design Data for the Preliminary Selection of Honeycomb Energy Absorption Systems", 1993 or earlier.

*Primary Examiner*—Karin L. Tyson
*Attorney, Agent, or Firm*—Tarolli, Sundheim, Covell, Tummino & Szabo

[57] ABSTRACT

A seat belt webbing retractor (22) includes a spool (72) on which a length of belt webbing (16) is wound. A stop member (100) is fixed in position on a vehicle. A crush plate (60) is secured to the retractor (22), and both the retractor (22) and the crush plate (60) are movable in a direction (132) toward the stop member (100). A crushable energy absorbing material, preferably a honeycomb (130), is disposed in the path of movement of the crush plate (60). The crushable material (130) controls movement of the crush plate (60) relative to the stop member (100), reducing the abruptness of the load on a vehicle occupant during a collision. In a second embodiment, the resistance provided by a crushable member (280) may be controlled in response to a sensed characteristic (310) of the vehicle occupant.

25 Claims, 5 Drawing Sheets

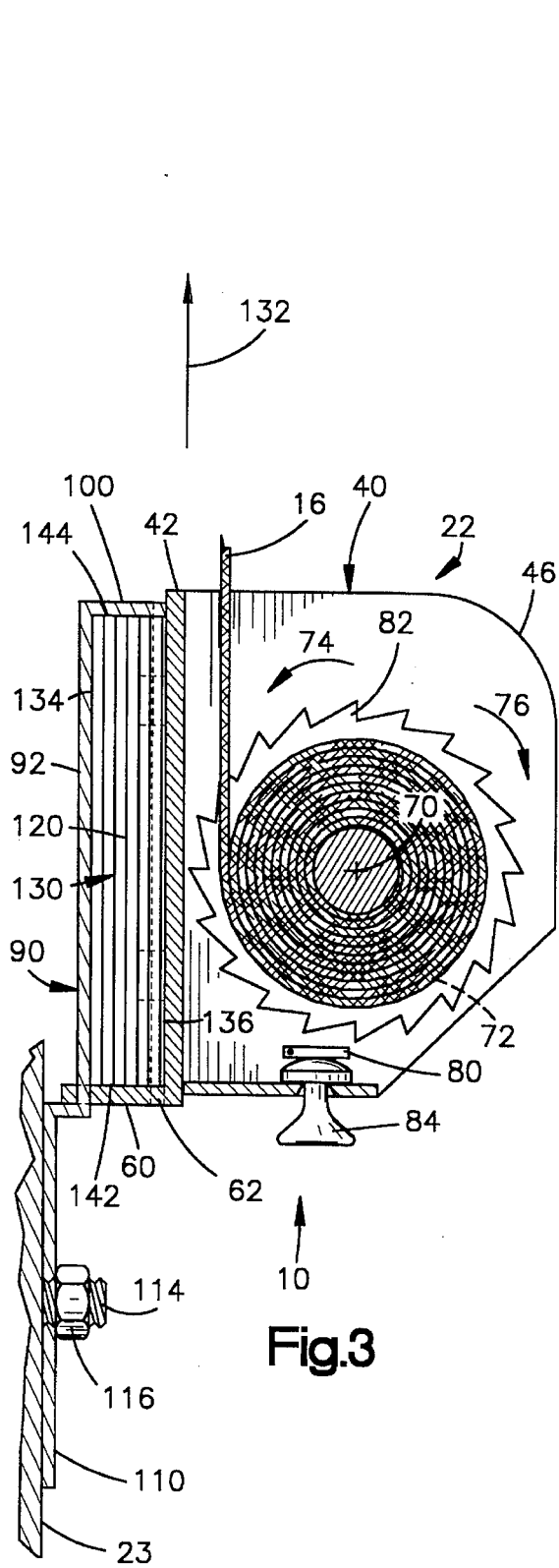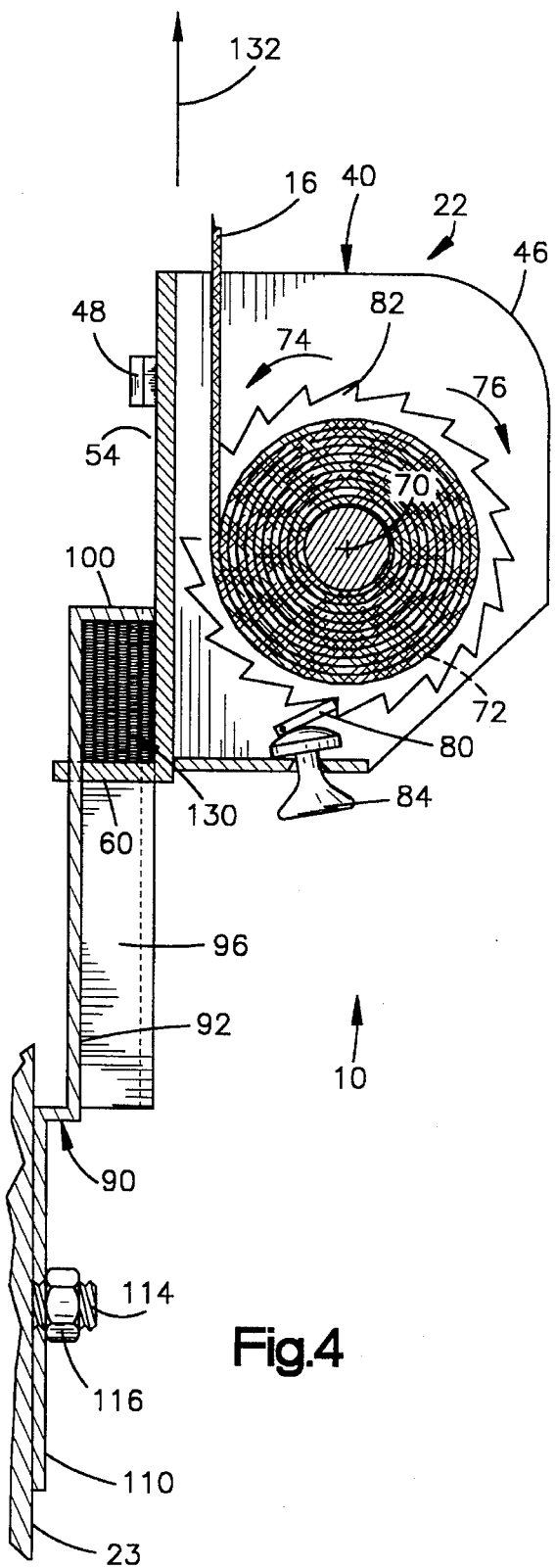

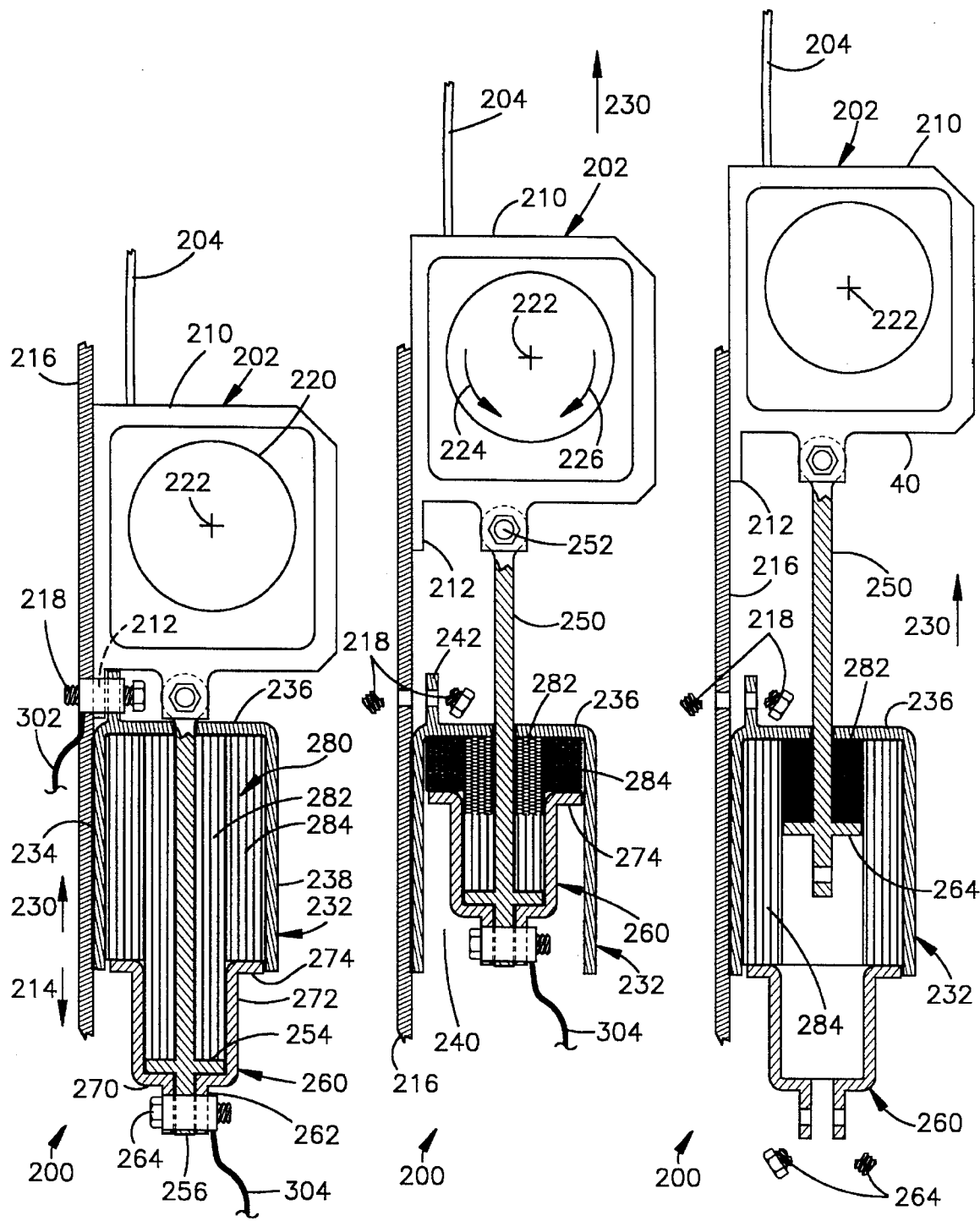

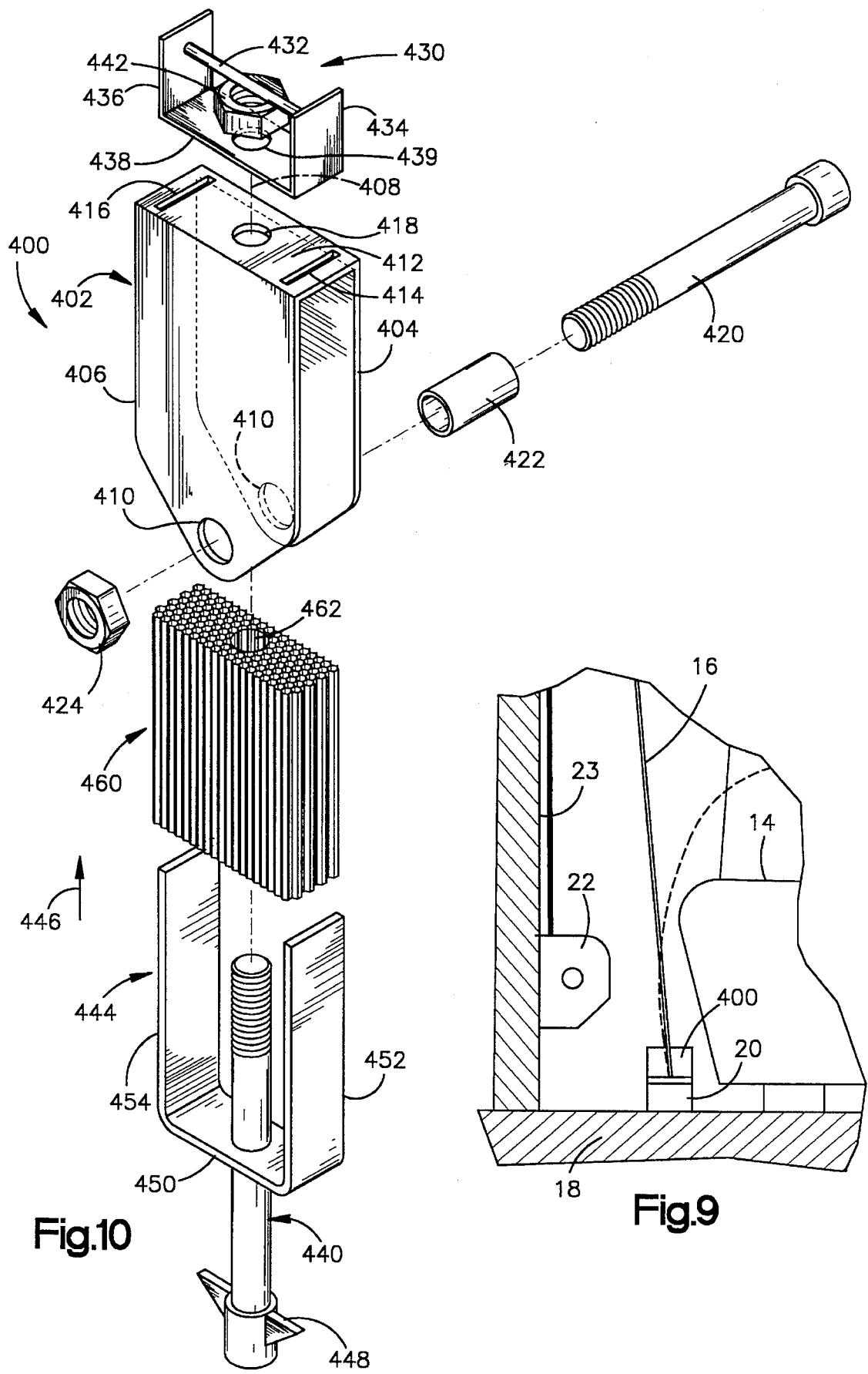

SEAT BELT WEBBING ENERGY MANAGEMENT DEVICE

BACKGROUND OF THE INVENTION

1. Technical Field

The present invention relates to a vehicle occupant restraint system. In particular, the present invention relates to an energy management device for seat belt webbing used in a seat belt system.

2. Description of the Prior Art

Seat belt systems are commonly used to restrain vehicle occupants. A typical seat belt system for a vehicle occupant includes a length of belt webbing extensible about the occupant and anchored to the vehicle. In the event of sudden deceleration such as occurs in a vehicle collision, the occupant continues to move forward relative to the vehicle and is restrained by the belt webbing.

The vehicle occupant can experience a sudden load if the occupant's forward movement is restrained by an inextensible length of belt webbing. To alleviate this sudden load, it is known to stitch together portions of the belt webbing. When the occupant engages the belt webbing with sufficient force, the load on the belt webbing tears the stitching. The tearing action produces a reduced force in the webbing as compared to a system without the tear stitching. The belt webbing portions separate producing a resistive force, and the belt webbing extends. Thus, the occupant's movement is restrained at a reduced rate over an increased period of time. This can reduce the abruptness of the load experienced by the vehicle occupant.

SUMMARY OF THE INVENTION

The present invention is a vehicle safety apparatus including a length of seat belt webbing for restraining a vehicle occupant and a seat belt webbing retractor having a spool on which the seat belt webbing is wound. A crush plate is secured to the retractor. The retractor and the crush plate are mounted on the vehicle for movement in a first direction. A crushable energy absorbing material is disposed in the path of movement of the crush plate for controlling movement of the retractor in the first direction. The crushable energy absorbing material may be a honeycomb made from a material such as aluminum. The vehicle safety apparatus may include means for sensing a characteristic of the vehicle occupant and/or means for sensing a vehicle crash characteristic and means for controlling the crush resistance of the crushable energy absorbing material in response to the measured characteristic of the vehicle and/or the vehicle occupant.

BRIEF DESCRIPTION OF THE DRAWINGS

Further features of the present invention will become apparent to those skilled in the art to which the present invention relates from reading the following specification with reference to the accompanying drawings, in which:

FIG. 3 is a side view partially in section showing the energy management device of FIG. 1 in an unactuated condition;

FIG. 4 is a view similar to FIG. 3 and showing the energy management device of FIG. 1 in an actuated condition;

FIG. 5 is a schematic side view, partially in section, of a seat belt webbing energy management device in accordance with a second embodiment of the present invention;

FIG. 6 is a view similar to FIG. 5 and showing the energy management device of FIG. 5 in a first actuated condition;

FIG. 7 is a view similar to FIG. 5 and showing the energy management device of FIG. 5 in a second actuated condition;

FIG. 9 is a schematic illustration of a portion of a vehicle seat belt system including a seat belt webbing energy management device in accordance with a third embodiment of the present invention; and FIG. 10 is an exploded perspective view of the energy management device of FIG. 9.

DESCRIPTION OF PREFERRED EMBODIMENTS OF THE INVENTION

Figure 1:
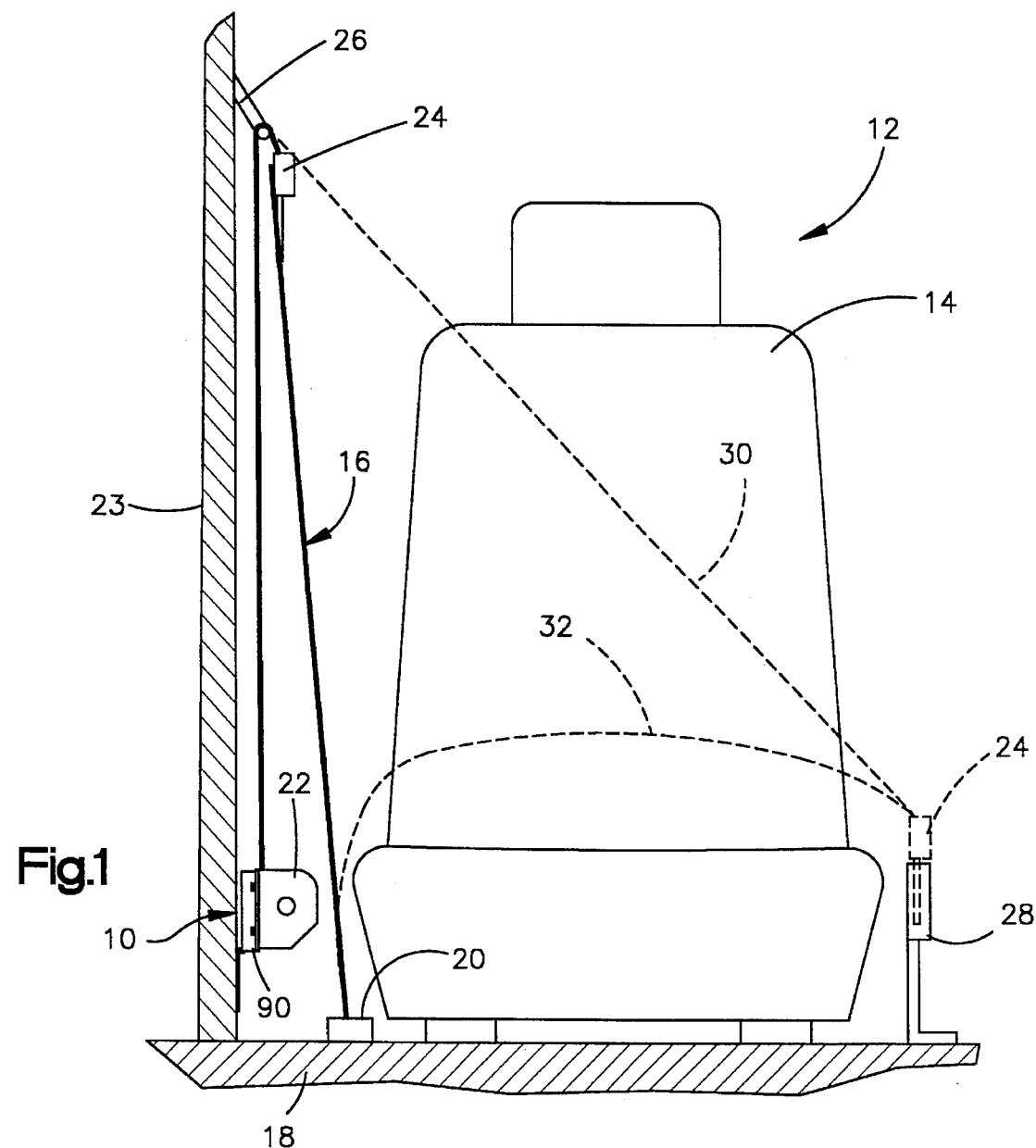
FIG. 1 is a schematic illustration of a vehicle seat belt system including a seat belt webbing energy management device in accordance with the present invention.
Figure 8:
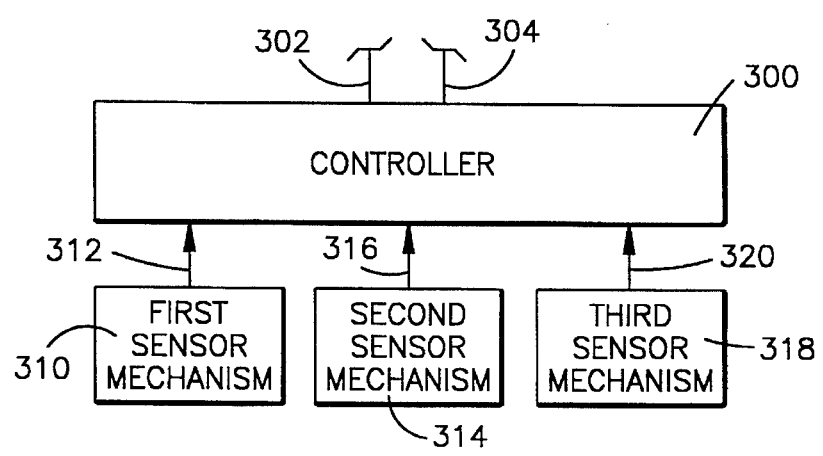
FIG. 8 is a block diagram showing components of vehicle electrical circuitry for controlling the operation of the energy management device of FIG. 5.

The present invention relates to a vehicle occupant restraint and, in particular, to an energy management device for seat belt webbing in a vehicle occupant restraint system. As representative of the present invention, FIG. 1 illustrates an energy management device 10. The energy management device 10 is incorporated in a three-point continuous loop seat belt system 12 for use in restraining an occupant of a vehicle.

During operation of the vehicle, an occupant of the vehicle sits on a seat 14 which is illustrated as a front passenger seat in the vehicle. A length of seat belt webbing 16 is extensible about the vehicle occupant. One end of the length of belt webbing 16 is anchored to the vehicle body 18 at an anchor point 20. The opposite end of the belt webbing 16 is attached to a seat belt retractor 22 secured to the vehicle B-pillar 23 in a manner described below. Intermediate its ends, the belt webbing 16 passes through a tongue assembly 24 and a D-ring 26. When the seat belt system 12 is not in use, the belt webbing 16 is wound on the retractor 22 and is oriented generally vertically on one side of the seat 14, as shown in solid lines in FIG. 1.

To engage the seat belt system 12, the tongue assembly 24 is manually grasped and is pulled across the lap and torso of the occupant sitting in the seat 14. As the tongue assembly 24 is pulled across the lap and torso of the occupant, the tongue assembly moves along the belt webbing 16, and the belt webbing is unwound from the retractor 22. When the belt webbing 16 has been pulled across the lap and torso of the occupant, the tongue assembly 24 is connected with a buckle 28, as shown in dashed lines in FIG. 1. The buckle 28 is connected to the vehicle body 18 and is disposed on the side of the seat 14 opposite the anchor point 20. When the seat belt system 12 is thus buckled, the length of belt webbing 16 is divided by the tongue assembly 24 into a torso portion 30 which extends across the torso of the occupant and a lap portion 32 which extends across the lap of the occupant.

Figure 2:
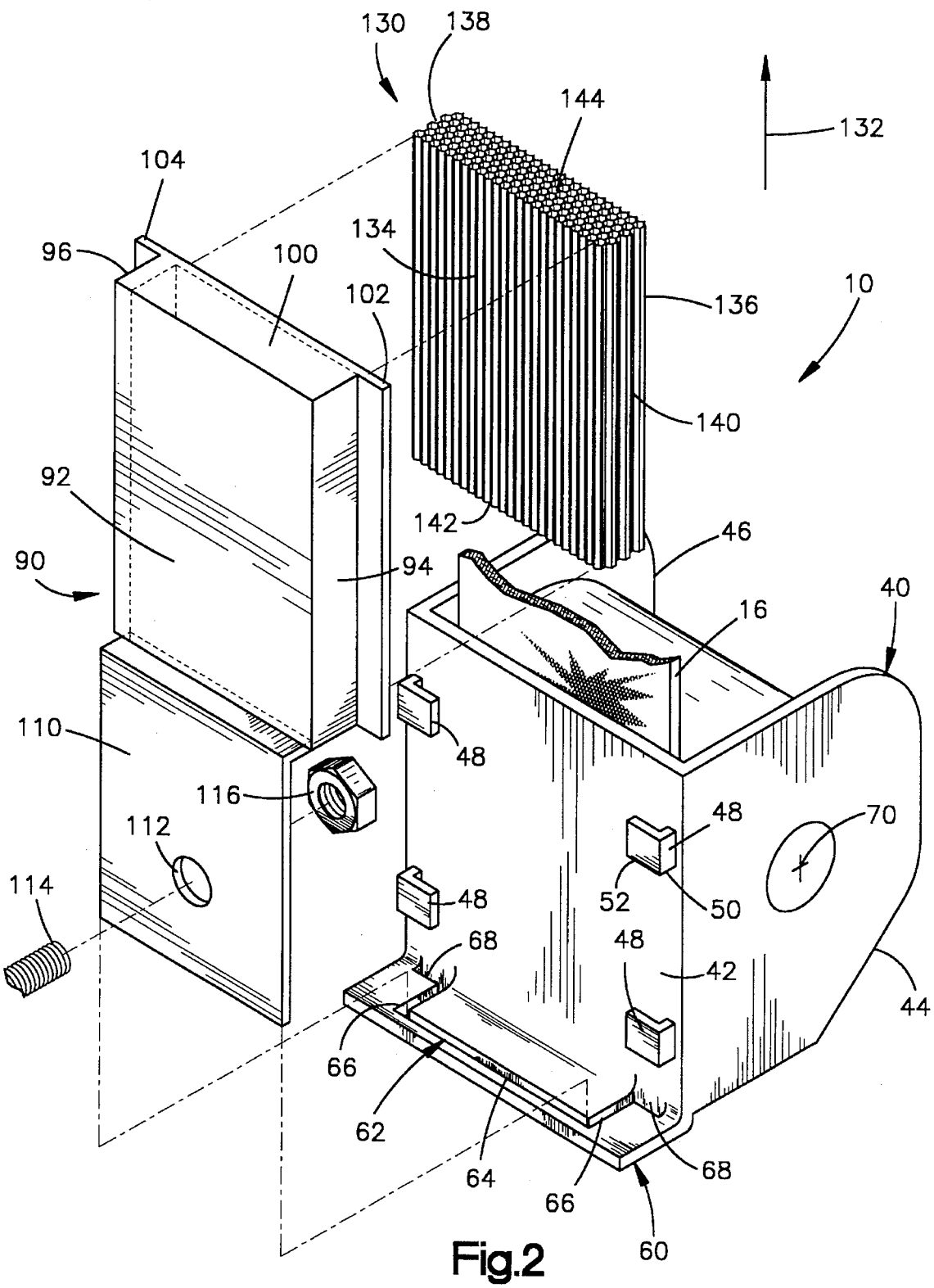
FIG. 2 is an exploded perspective view of the energy management device of FIG. 1.

The retractor 22, which forms a portion of the energy management device 10, includes a frame 40 (FIG. 2). The frame 40 is a single piece of sheet metal stamped and formed to a U-shaped configuration which includes a back wall 42 and spaced parallel side walls 44 and 46.

Two pairs of opposed guide tabs 48 are formed on the back wall 42 of the retractor frame 40. Each guide tab 48 has a first leg 50 extending perpendicular to the back wall 42 and a second leg 52 extending from the first leg 50 in a direction parallel to the back wall. Each one of the second legs 52 of the guide tabs 48 is spaced apart from the back wall 42 by the same predetermined distance. The guide tabs 48 define between them a channel 54 which extends parallel to and along the outer side surface of the back wall 42 of the retractor frame 40.

The retractor frame 40 includes a crush plate 60 which is formed in one piece with the frame 40 and which extends in a direction perpendicular to the back wall 42 from the lower end (as viewed in FIG. 2) of the back wall. A guide slot 62 which is preferably U-shaped extends through the crush plate 60. The guide slot 62 could be of a different shape. The guide slot 62 includes a base portion 64 which extends parallel to the plane of the back wall 42. Parallel side portions 66 of the guide slot 62 extend from opposite ends of the base portion 64 in a direction perpendicular to the base portion and parallel to the side walls 44 and 46 of the retractor frame 40. Parallel flange portions 68 of the guide slot 62 extend from the ends of the side portions 66 along the back wall 42 of the frame 40.

A spool axis 70 (FIGS. 2 and 3) of the retractor 22 extends between the frame side walls 44 and 46 in a direction parallel to the back wall 42. A spool 72 (FIG. 3) is supported on the frame 40 for rotation about the spool axis 70 relative to the frame in a belt winding direction 74 and in an opposite belt withdrawal direction 76. The seat belt webbing 16 is wound on the spool 70. The unwound portion of the seat belt webbing 16 extends upward from the retractor 22, as shown in FIGS. 1–4.

A rewind spring mechanism (not shown) on the frame 40 is connected with the spool 72 and biases the spool 72 for rotation in the belt winding direction 74. The retractor 22 includes a spool locking mechanism which includes a pawl 80, a ratchet 82, and a vehicle deceleration sensing mechanism 84. The spool locking mechanism 80–84 blocks rotation of the spool 72 in the belt withdrawal direction 76 in the event of vehicle deceleration above a predetermined level. The retractor 22 may also include web sensing means (not shown) for blocking rotation of the spool 72 in the belt withdrawal direction 76 in the event of belt withdrawal at a rate above a predetermined rate.

The energy management device 10 includes a mounting bracket 90 (FIG. 2) for supporting the retractor 22 on the vehicle B-pillar 23. The mounting bracket 90 (FIGS. 2–4) is made from sheet metal and includes a back wall 92 and spaced parallel side walls 94 and 96 which extend perpendicular to the back wall. The side walls 94 and 96 of the mounting bracket are spaced apart by a distance equal to the distance (as measured in a direction parallel to the spool axis 70) between the side portions 66 of the guide slot 62 of the crush plate 60.

The back wall 92 of the mounting bracket 90 is received in the base portion 64 of the guide slot 62 on the crush plate 60. The side walls 94 and 96 of the mounting bracket 90 are received in the side portions 66 of the guide slot 62. The mounting bracket 90 also includes a pair of guide flanges 102 and 104 which extend outwardly from the side walls 94 and 96, respectively. The guide flanges 102 and 104 are received in the flange portions 68 of the guide slot 62 of the crush plate 60 and extend between the second legs 52 of the guide tabs 48 and the back wall 42 of the retractor frame 40.

An end wall 100 of the mounting bracket extends perpendicular to the back wall 92 and to the side walls 94 and 96. The end wall 100 connects the back wall 92 with the side walls 94 and 96 to close the upper end (as viewed in FIG. 2) of the mounting bracket 90.

An attachment portion 110 of the mounting bracket 90 extends from the lower end of the back wall 92 of the mounting bracket. The attachment portion 110 is generally L-shaped so that it extends first perpendicular to the back wall 92 and then parallel to, but spaced from, the plane of the back wall. A fastener opening 112 is formed in the attachment portion 110. A bolt 114 and a nut 116 fix the mounting bracket 90 in position on the vehicle B-pillar 23.

The retractor frame 40 and the mounting bracket 90 together define a chamber 120 (FIG. 3). The chamber 120 has a rectangular configuration. A crushable energy absorbing material 130, which is preferably a honeycomb, is disposed in the chamber 120. The honeycomb 130 is made of aluminum or stainless steel honeycomb material which may be purchased from Hexcel Corporation of Dublin, Calif. The honeycomb 130 could alternatively be made of plastic, which generally has a lower crush resistance than metal. The honeycomb 130 comprises a plurality of layers of material defining cells which extend parallel to the back wall 42 of the retractor frame 40 in a first direction 132 (upward as viewed in FIGS. 3 and 4). As explained in more detail below, the honeycomb 130 has a linear crush resistance.

The honeycomb 130 (FIG. 2) has a rectangular configuration. The honeycomb 130 has generally parallel major side surfaces 134 and 136 and generally parallel minor side surfaces 138 and 140, all which extend parallel to the first direction 132. The honeycomb 130 also has parallel lower and upper end surfaces 142 and 144 which extend perpendicular to the side surfaces 134–140 and perpendicular to the first direction 132. The upper end portion of the honeycomb 130 including the upper end surface 144 is precrushed.

FIG. 3 illustrates the parts of the energy management device 10 in an unactuated condition. The honeycomb 130 is disposed in the chamber 120 between the retractor 22 and the mounting bracket 90. The lower end surface 142 of the honeycomb 130 is in abutting engagement with the crush plate 60. The upper end surface 144 of the honeycomb 130 is in abutting engagement with the end wall 100 of the mounting bracket 90. One major side surface 136 of the honeycomb 130 is in abutting engagement with the back wall 42 of the retractor frame 40. The opposite major side surface 134 of the honeycomb 130 is in abutting engagement with the back wall 92 of the mounting bracket 90. The minor side surfaces 138 and 140 of the honeycomb 130 are in abutting engagement with the side walls 96 and 94 of the mounting bracket 90. The guide tabs 48 and the guide slot 62 on the retractor frame 40 cooperate with the mounting bracket 90 to support the retractor 22 for sliding movement in the direction 132 relative to the mounting bracket.

The honeycomb 130 resists movement of the crush plate 60 in the direction 132 toward the end wall 100 of the mounting bracket 90. The crush resistance of the honeycomb 130 is selected so that the honeycomb blocks movement of the retractor 22, including the crush plate 60, in the direction 132 unless a tensile force greater than a predetermined force is applied to the belt webbing 16 when the spool locking mechanism 80–84 is actuated. The predetermined force is selected to be a force which is not normally experienced during use of the vehicle safety belt system 12 other than in a vehicle collision. Thus, the parts of the energy management device 10, including the retractor 22 and the mounting bracket 90, are normally in the position shown in FIG. 3, in which the honeycomb 130 is not crushed.

In the event of sudden deceleration such as occurs in a vehicle collision, the vehicle occupant continues moving forward in the vehicle relative to the vehicle seat 14 and engages the belt webbing 16. Simultaneously, the vehicle deceleration sensing mechanism 84 causes the pawl 80 to move into engagement with the ratchet 82 to block rotation of the spool 72 in the belt withdrawal direction 76. Once the spool 72 is thus locked, the kinetic energy of the forward moving vehicle occupant is transmitted through the belt webbing 16 and the spool 72 into the retractor frame 40.

The honeycomb 130 blocks sliding movement of the retractor frame 40 in the direction 132 until a tensile force greater than the predetermined force is applied to the belt webbing 16. When a force greater than the predetermined force is applied to the belt webbing 16, the honeycomb 130 begins to crush and the retractor 22 moves in the direction 132, over a period of time, from the position shown in FIG. 3 to the position shown in FIG. 4.

As the retractor moves in the direction 132, the crush plate 60 slides along the walls 42, 92, 94 and 96 and moves in the direction 132 through the chamber 120. The honeycomb 130 crushes and slows movement of the crush plate 60 as long as sufficient force is applied to the honeycomb 130. The end wall 100 of the mounting bracket 90 acts as a stop member against which the force of the crush plate 60, as transmitted through the honeycomb 130, is exerted. The force exerted by the moving crush plate 60 on the honeycomb 130 causes the honeycomb to be crushed between the moving crush plate and the end wall 100 of the mounting bracket 90. A property of the material of the honeycomb 130 causes the honeycomb to crush from its precrushed upper end portion including the surface 144 to its lower end surface 142. The layers of material defining the cells crush (local buckling) simultaneously without column buckling as the crush plate 60 moves toward the end wall 100. Eventually, the honeycomb 130 is crushed into a relatively short, almost solid mass of material as seen in FIG. 4, and the crush plate 60 is blocked from further movement. The retractor 22, which is fixed for movement with the crush plate 60, ceases moving in the direction 132. The tensile force on the belt webbing 16 is thereafter transmitted substantially undiminished between the retractor frame 40 and the vehicle B-pillar 23.

The crushing of the honeycomb 130 is not instantaneous but instead occurs over a period of time. During this time period, the seat belt system 12 does not fully block forward movement of the vehicle occupant. The occupant's forward movement does not cease until the force applied to the webbing 16 by the occupant is not sufficient to crush the honeycomb 130. At this time, the retractor 22 stops moving in the direction 132 relative to the B-pillar 23.

In an event such as a vehicle collision, occupant deceleration resulting from engagement with the seat belt system 12 occurs over a longer period of time than it would occur if the belt webbing in the system were connected to an immovable retractor, rather than to the energy management device 10. In addition, the crushing of the honeycomb 130 reduces the shoulder seat belt restraining force, $F_{shb}$, acting on the occupant's upper torso. Thus, as described more fully below, more crash energy is dissipated by the seat belt system 12, and the amount of energy transferred through the seat belt webbing to the occupant is reduced.

The principle of conservation of energy states that the total occupant crash energy must be conserved. The total occupant crash energy is ½ m $(v_i^2 - v_f^2)$, where m is the occupant's mass, $v_i$ is the velocity of the occupant at the beginning of the crash, and $v_f$ is the velocity of the occupant at the end of the crash. The total occupant crash energy is dissipated by performing work on the occupant. Work, which is a force applied over a distance, must be performed on the occupant to stop the occupant's motion. In a crash, work is performed on a vehicle occupant in a variety of means, including physical absorption by the occupant (through a force applied to and deflecting the occupant's chest), interaction between the occupant and the vehicle seat, and interaction between the occupant and the seat belt system. The purpose of the energy management device 10 is to reapportion the work among the various means so that more work is performed by interaction between the occupant and the seat belt system and less is physically absorbed by the occupant. The occupant's interaction with the seat belt system causes energy to be dissipated through two basic mechanisms—deformation of the components of the system and crushing of the honeycomb material.

The energy dissipated through the webbing into the occupant is represented by the integral of the shoulder belt restraining force, $F_{shb}$, with respect to crash ridedown distance, x (i.e., the distance through which the occupant moves with respect to a fixed point on the ground during a crash) or $\int F_{shb}^{dx}$. The energy dissipated through crushing of the honeycomb material is represented by the integral of the shoulder belt restraining force, $F_{shb}$, with respect to the occupant restraint crush distance, x' (i.e., the distance through which the occupant moves with respect to the vehicle as the honeycomb is being crushed during a crash or $\int F_{shb}^{dx'}$.

Because the honeycomb material crushes, the distance, x', through which the occupant moves with respect to the vehicle as the honeycomb is being crushed during a crash, has a value greater than zero. For a given shoulder belt restraining force, $F_{shb}$, the greater the distance, x', the larger the value of the integral, $\int F_{shb}^{dx'}$ and the more energy that is dissipated through crushing of the honeycomb material. Because the honeycomb has little resilience i.e., large hysteresis, there is little energy stored in the honeycomb which can be transferred back into the seat belt system 12 at a later point in the crash. The dissipation of energy through crushing of the honeycomb material also reduces the energy transferred through the seat belt webbing into the occupant. Specifically, since the total occupant crash energy must be conserved, any dissipation of energy through crushing of the honeycomb material reduces the amount of energy transferred through the seat belt webbing into the occupant. The energy management device 10 thus helps to manage and control the kinetic energy of the moving vehicle occupant resulting from sudden vehicle deceleration.

The speed of movement of the crush plate 60 is controlled by the honeycomb 130. The material of the honeycomb 130 has a nearly linear crush resistance. Therefore, as the crush plate 60 moves toward the end wall 100, the honeycomb 130 provides a constant and unvarying resistance to the movement of the crush plate. The structure and material of the honeycomb 130 can be varied to control the crush resistance of the honeycomb and thus the rate of movement of the crush plate 60 in the chamber 120. Accordingly, selection of an appropriate material for the honeycomb 130 can control the characteristics of the energy management device 10 including the rate of movement of the retractor 22. Crushable honeycomb materials and their characteristics are well known.

FIGS. 5–8 illustrate an energy management device 200 in accordance with a second embodiment of the present invention for controlling movement of a seat belt webbing retractor 202. Like the energy management device 10 illustrated in FIGS. 1–4, the energy management device 200 operates by crushing honeycomb material. The energy management device 200, including the retractor 202, and an associated length of belt webbing 204 may be substituted in the seat belt system 12 shown in FIG. 1 for the energy management device 10, including the retractor 22, and the belt webbing 16.

The retractor 202 includes a frame 210 having an anchor portion 212 which extends downward, that is, in a direction as indicated by the arrow 214 (FIG. 5). The anchor portion 212 is disposed adjacent to and extends alongside the vehicle B-pillar 216. A first releasable bolt 218 connects the anchor portion 212 of the retractor 202 to the B-pillar 216 to block movement of the retractor relative to the B-pillar.

A spool 220 is supported on the retractor frame 210 for rotation about a spool axis 222 in a belt winding direction 224 (FIG. 6) and in an opposite belt withdrawal direction 226. A portion of the seat belt webbing 204 is wound on the spool 220. The unwound portion of the seat belt webbing 204 extends upward from the retractor 202, that is, in a direction as indicated by the arrow 230. The retractor 202 also includes a rewind spring mechanism and a spool locking mechanism (both not shown) as described above with reference to the first embodiment of the invention.

The energy management device 200 includes a reaction cup 232 which is fixed to the vehicle B-pillar 216 preferably by welding as shown at 234 or other means. The reaction cup 232 is disposed below the retractor 202. Thus, the retractor 202 is disposed intermediate the reaction cup 232 and the portion of the belt webbing 204 which extends upward from the retractor.

The reaction cup 232 has a cylindrical cup-shaped configuration including a radially extending top wall 236 which is formed as one piece with a cylindrical side wall 238. The top wall 236 and the side wall 238 define a chamber 240 (FIG. 6) in the reaction cup 232. A flange 242 extends upward from the top wall 236 in the direction 230 adjacent to and alongside the retractor anchor portion 212. The first releasable bolt 218 extends through the flange 242.

A connecting rod 250 is secured to the retractor frame 210 with a fastener 252. The connecting rod 250 extends downward from the retractor in the direction 214, that is, in a direction away from the spool 220. An inner crush plate 254 (FIG. 5) extends radially outward from the connecting rod 250 above a lower end portion 256 of the connecting rod. The inner crush plate 254 is smaller in diameter than the cylindrical side wall 238 of the reaction cup 232. The inner crush plate 254 is spaced apart from the top wall 236 of the reaction cup 232 by a first distance as seen in FIG. 5.

An outer crush plate 260 includes a ring-shaped, radially extending bottom wall 270 which is disposed below and in abutting engagement with the inner crush plate 254. The lower end portion 256 of the connecting rod 250 extends axially through the open center of the bottom wall 270 of the outer crush plate 260. A second releasable bolt 264 connects a lower end portion 262 of the outer crush plate 260 for movement with the lower end portion 256 of the connecting rod 250. A cylindrical side wall 272 of the outer crush plate 260 extends axially upward from the bottom wall 270 in the direction 230, that is, toward the top wall 236 of the reaction cup 232.

An annular flange portion 274 of the outer crush plate 260 extends radially outward from the upper end of the side wall 272. The flange portion 274 is spaced apart from the top wall 236 of the reaction cup 232 by a second distance, as seen in FIG. 5, which is less than the first distance by which the inner crush plate 254 is spaced from the top wall of the reaction cup.

The energy management device 200 also includes a two-part crushable honeycomb 280 which includes an inner honeycomb 282 and an outer honeycomb 284 both disposed in the chamber 240 in the reaction cup 232. The inner honeycomb 282 and the outer honeycomb 284 are preferably made of the same material as the honeycomb 130 illustrated with reference to the first embodiment of the invention. The inner and outer honeycombs 282, 284 may have different force characteristics. The inner honeycomb 282 is in the shape of an annulus and is disposed radially outward of the connecting rod 250. The inner honeycomb 282 extends in the direction 230 between the inner crush plate 254 and the top wall 236 of the reaction cup 232.

The outer honeycomb 284 is also in the shape of an annulus. The outer honeycomb 284 is disposed radially outward of the inner honeycomb 282 between the inner honeycomb and the side wall 238 of the reaction cup 232. The outer honeycomb 284 extends in the direction 230 between the flange portion 274 of the outer crush plate 260 and the top wall 236 of the reaction cup 232. Thus, the outer honeycomb 284, when in the uncrushed condition shown in FIG. 5, is shorter (from top to bottom as viewed in FIGS. 5–7) than the uncrushed inner honeycomb 282.

The energy management device 200 includes means for controlling crushing of the honeycomb portions 282, 284 in response to a sensed characteristic of the vehicle or of the vehicle occupant. The means for controlling includes a controller 300 (FIG. 8), such as a microcomputer, which provides a control signal on lines 302 and 304 to control actuation of the first and second releasable bolts 218 and 264, respectively. Three sensor mechanisms are connected to the controller 300. A first sensor mechanism 310 includes a sensor which senses a first characteristic of the vehicle occupant, such as the weight of the occupant, and provides an electrical signal on line 312 indicative of the occupant characteristic. A second sensor mechanism 314 includes a sensor which senses a second characteristic of the occupant, such as the location of the occupant in the vehicle, and provides an electrical signal on line 316 indicative of the second occupant characteristic.

A third sensor mechanism 318 includes a sensor which senses a vehicle collision characteristic, such as the severity of the vehicle collision (i.e., crash severity), and provides an electrical signal on line 320 indicative of the vehicle collision characteristic. The third sensor mechanism 318 may include a number of sensors located throughout different parts of the vehicle. In the event of a vehicle collision, these sensors cooperate to provide a signal on line 320 indicative of the crash severity. Such an arrangement of sensors is disclosed in U.S. Pat. No. 5,216,607, which is assigned to the assignee of the present application.

The controller 300 monitors the electrical signals on lines 312, 316 and 320 and generates the control signals on lines 302 and 304. The control signals on lines 302 and 304 are generated in accordance with a preprogrammed procedure stored in an internal memory of the controller 300. Microcomputers which are suitable for use as the controller 300 are readily available in the commercial market. Their internal structure and operation are well known in the art and, therefore, the controller 300 will not be described in further detail.

The control signals on lines 302 and 304, which control the actuation of the releasable bolts 218 and 264, vary in a manner described below as a function of at least one of the electrical signals on lines 312, 316 and 320 from the first, second and third sensor mechanisms 310, 314 and 318, respectively. Thus, the energy absorption characteristics of the energy management device 200 vary as a function of the weight of the vehicle occupant and/or the location of the vehicle occupant and/or the crash severity.

The parts of the energy management device 200 are normally in the position shown in FIG. 5 in which the honeycombs 282 and 284 are in an uncrushed condition and the releasable bolts 218 and 264 are both in the unactuated condition. In the event of sudden deceleration such as occurs in a vehicle collision, the vehicle occupant continues moving forward in the vehicle relative to the seat 14 and engages the belt webbing 16. The vehicle deceleration sensing mechanism (not shown) blocks rotation of the spool 220 in the belt withdrawal direction 226. Once the spool is thus locked, a portion of the kinetic energy of the forward moving vehicle occupant is transmitted through the belt webbing 204 into the spool 220 and into the retractor frame 210.

The controller 300 constantly monitors the outputs of the second and third sensor mechanisms 314 and 318. The controller 300 selectively actuates one or both of the bolts 218 and 264, in the manner described below, only if the third sensor mechanism 318 determines that the crash severity is above a predetermined threshold. If the determination of the third sensor mechanism 318 is not positive, then the controller 300 maintains the bolts 218 and 264 in the unactuated condition regardless of the determination of the first sensor mechanism 310. Alternatively, the second sensor mechanism 314 could be used in addition to the third sensor mechanism 318 to enable actuation of one or both of the bolts 218 and 264 only if the second sensor mechanism also determines that the occupant is in a position to allow the occupant to be restrained safely with an increased excursion distance as described below. If the second sensor mechanism 314 is thus additionally used, and if one or both of the determinations of the sensor mechanisms 318 and 314 is not positive, then the controller 300 maintains both the first and second releasable bolts 218 and 264 in the unactuated condition regardless of the determination of the first sensor mechanism 310. This determination of either (a) the third sensor mechanism 318 only or (b) the third sensor mechanism and the sensor mechanism 314, is referred to below as the initial determination of the controller 300.

The controller 300 also monitors constantly the output of the first sensor mechanism 310, i.e., the vehicle occupant weight sensor mechanism. The energy management device 200 is actuatable into one of three discrete stages or conditions to resist movement of the retractor 202 in the direction 230. If the initial determination of the controller 300 is positive, then the controller 300 actuates the energy management device 200 into a selected one of the three discrete conditions as described below, depending on the output of the first sensor mechanism 310.

The energy management device 200 is actuated into the first condition when the first sensor mechanism 310 senses that the occupant weight is greater than a predetermined first threshold of preferably 180 pounds. When this is the case, the controller 300 maintains both the first releasable bolt 218 and the second releasable bolt 264 in the unactuated condition. Tensile force on the belt webbing 204 is transferred undiminished through the retractor frame anchor portion 212 and the first releasable bolt 218 and into the vehicle B-pillar 216. The retractor 202 does not move in the direction 230 relative to the vehicle B-pillar 216.

The energy management device 200 is actuated into the second condition when the first sensor mechanism 310 determines that the occupant weight is in a predetermined intermediate range preferably between 130 pounds and 180 pounds. When this is the case, the controller 300 actuates the first releasable bolt 218 but maintains the second releasable bolt 264 in the unactuated condition. When the first bolt 218 is actuated, the retractor anchor portion 212 is disconnected from the vehicle B-pillar 216 and from the reaction cup 232. The retractor 202 is thus movable in the upward direction 230 relative to the B-pillar 216 and the reaction cup 232. The tensile force on the belt webbing 204, as applied through the retractor frame 210, is transferred into the connecting rod 250, which moves upward in the direction 230. The retractor 202 moves in the direction 230, over a period of time, from the position shown in FIG. 5 to the position shown in FIG. 6.

Because the inner crush plate 254 is fixed for movement with the connecting rod 250, upward movement of the connecting rod results in upward movement of the inner crush plate. At the same time, because the second releasable bolt 264 is in the unactuated condition, upward movement of the connecting rod 250 also results in upward movement of the outer crush plate 260. The honeycombs 282 and 284 are disposed in the path of movement of the crush plates 254 and 260, respectively, and resist movement of the crush plates in the direction 230, in the manner described above with reference to the first embodiment of the invention. The combined crushed resistance of the first and second honeycombs 282 and 284 is not sufficient to block movement of the crush plates 254 and 260 toward the top wall 236 of the reaction cup 232. The top wall 236 of the reaction cup 232 acts as a stop member against which the force of the crush plates 254 and 260, as transmitted through the honeycombs 282 and 284, is exerted. The upward movement of the crush plates 254 and 260 ceases when the outer honeycomb 284 is crushed into a relatively short mass of material, as seen in FIG. 6. The inner honeycomb 282 is only partially crushed. The retractor 202 moves upward in the direction 230 by a third distance. Because the retractor 202 has moved, both the time period and the distance over which the forward movement of the vehicle occupant is restrained are increased as compared to the first condition of the energy management device 200. This lessens the shock load on the vehicle occupant.

The energy management device 200 is actuated into the third condition when the first sensor mechanism 310 determines that the occupant weight is less than a predetermined third threshold preferably 130 pounds. When this is the case, the controller 300 actuates both the first and second releasable bolts 218 and 264. Actuating the first releasable bolt 218 disconnects the retractor anchor 212 from the vehicle B-pillar 216 and from the reaction cup 232. The retractor 202 is thus movable in the direction 230 relative to the vehicle B-pillar 216 and to the reaction cup 232. Actuating the second bolt 264 disconnects the inner crush plate 254 from the outer crush plate 260. The inner crush plate 254 is thus movable in the direction 230 relative to the outer crush plate 260.

The tensile force on the belt webbing 204 is transferred through the retractor frame 210 into the connecting rod 250. The connecting rod 250 moves upward in the direction 230. Because the inner crush plate 254 is fixed for movement with the connecting rod 250, upward movement of the connecting rod results in upward movement of the inner crush plate. Because the second releasable bolt 264 is actuated, upward movement of the connecting rod 250 does not result in upward movement of the outer crush plate 260. Thus, only the inner crush plate 254 moves upward with the retractor 202.

The inner crush plate 254 moves in the direction 230 toward the top wall 236 of the reaction cup 232. The crush resistance of the inner honeycomb 282 is not sufficient to block movement of the inner crush plate 254 toward the top wall 236 of the reaction cup 232, only to slow it down. The retractor 202 moves in the direction 230, over a period of time, from the position shown in FIG. 5 to the position shown in FIG. 7.

The inner honeycomb 282 is disposed in the path of movement of the inner crush plate 254 and resists movement of the inner crush plate in the direction 230, in the manner described above. The top wall 236 of the reaction cup 232 acts as a stop member against which the force of the inner crush plate 254, as transmitted through the inner honeycomb 282, is exerted. The upward movement of the inner crush plate 254 ceases when the inner honeycomb 282 is crushed into a relatively short mass of material, as seen in FIG. 7. The outer honeycomb 284 is undisturbed and uncrushed.

As previously discussed, the resistance to movement of the retractor 202 in the direction 230 is controlled by the resistance which the honeycombs 282 and 284 provide through the inner and outer crush plates 254 and 260, respectively. The inner honeycomb 282 alone provides less resistance to movement than does the combination of the inner and outer honeycombs 282 and 284. Therefore, the energy management device 200, when in the third condition, provides less resistance to movement of the retractor 202 than does the energy management device when in the second condition. This lower resistance lessens the shock load on the vehicle occupant through the belt webbing 204, which is desirable because the controller 300 has determined that a relatively light vehicle occupant is seated in the vehicle seat 14.

When the energy management device 200 is in the third condition, the retractor 202 moves upward in the direction 230 by a fourth distance, that is, the distance of movement of the inner crush plate 254 as seen in FIG. 7. This fourth distance is greater than the third distance, that is, the distance of movement of the outer crush plate 260 as seen in FIG. 6. Thus, the retractor 202 moves farther in the direction 230 when only the inner honeycomb 282 is crushed, as compared to the distance of movement of the retractor which occurs when the energy management device 200 is in the second condition.

Because the retractor 202 moves, the time period over which the forward movement of the vehicle occupant is restrained is increased as compared to the shock load distribution which occurs when the energy management device 200 is in the first condition (FIG. 5). Thus, both the time period and the distance over which the forward movement of the vehicle occupant is restrained are increased as compared to the shock load distribution which would occur if the energy management device 200 were not in the path of force transmission between the belt webbing 16 and the vehicle body 18.

FIGS. 9 and 10 illustrate a seat belt webbing energy management device 400 in accordance with a third embodiment of the present invention. As shown schematically in FIG. 9, the energy management device 400 is connected between the belt webbing 16 and the anchor point 20 at the outboard side of the vehicle seat 14 in place of the energy management device 10. Other portions of the vehicle seat belt system 12 (FIG. 1) in which the energy management device 400 is incorporated are the same.

The energy management device 400 includes a reaction member 402. The reaction member 402 has an inverted U-shaped configuration with spaced side walls 404 and 406 extending parallel to an axis 408. A circular opening 410 is formed in the lower end portion of each respective side wall 404, 406. An end wall 412 of the reaction member 402 is formed as one piece with the side walls 404 and 406 and interconnects the side walls. A pair of guide slots 414 and 416 extend through the end wall 412. A circular opening 418 is formed in the end wall 412 at a location centered on the axis 408.

The reaction member 402 is secured to the vehicle body 18 (not shown in FIG. 10) with an assembly of a bolt 420, a sleeve 422 and a nut 424. The bolt 420 extends through the sleeve 422 which is located in the openings 410 in the side walls 404 and 406 of the reaction member 402. The nut 424 is screwed on the bolt 420.

The energy management device 400 also includes a U-shaped end fitting 430. The end fitting 430 includes a pin 432 to which an end portion of the belt webbing 16 (not shown in FIG. 10) is secured. Opposite ends of the pin 432 are secured in axially extending side walls 434, 436 of the end fitting 430. An end wall 438 of the end fitting 430 is formed as one piece with the side walls 434, 436 and extends parallel to the end wall 412 of the reaction member 402. A circular opening 439 in the end wall 438 is centered on the axis 408.

A bolt 440 extends through the opening 439 in the end wall 438 of the end fitting 430. A nut 442 is screwed on the bolt 440 and is disposed on the upper side surface of the end wall 438. A head portion 448 of the bolt 440 is disposed under an end wall 450 of a crush plate 444. The crush plate 444 has a U-shaped configuration and includes parallel axially extending side walls 452, 454 which are formed as one piece with the end wall 450. The end wall 450 extends parallel to the end wall 412 of the reaction member 402, when the energy management device 400 is in an assembled condition (not shown), at a location above (as viewed in FIG. 10) the bolt 420. Upper end portions of the side walls 452, 454 of the crush plate 444 extend through the guide slots 414, 416 in the end wall 412 of the reaction member 402.

A crushable energy absorbing honeycomb 460 is disposed in a forced transmitting relationship between the end wall 450 of the crush plate 444 and the end wall 412 of the reaction member 402. The honeycomb 460 may be made of the same material as the honeycomb 130 described with reference to the first embodiment of the invention. The bolt 440 extends through an axially extending central passage 462 in the honeycomb 460.

The assembled energy management device 400 is installed at the location shown in FIG. 9. In the event of sudden deceleration such as occurs in a vehicle collision, the vehicle occupant continues moving forward in the vehicle relative to the vehicle seat 14 and engages the belt webbing 16. The kinetic energy of the forward moving vehicle occupant is transmitted through the belt webbing 16, the end fitting 430 and the bolt 440 into the crush plate 444.

The honeycomb 460 blocks movement of the crush plate 444 in a direction toward the end wall 412 of the reaction member 402 until a tensile force greater than a predetermined force is applied to the belt webbing 16. When a force greater than the predetermined force is applied to the belt webbing 16, the honeycomb 460 begins to crush and the crush plate 444 moves upward in the direction 446, over a period of time. The force exerted by the moving crush plate 444 on the honeycomb 160 causes the honeycomb to be crushed between the moving crush plate and the end wall 412 of the reaction member 402. The honeycomb 460 crushes and slows movement of the crush plate 444 as long as sufficient force is applied to the honeycomb. The end wall 412 of the reaction member 402 acts as a stop member against which the force of the crush plate 444, as transmitted through the honeycomb 460, is exerted.

Eventually, the honeycomb 460 is crushed into a relatively short, almost solid mass of material, and the crush plate 444 is blocked from further movement. Further movement of the end fitting 430 in the upward direction 446 is thus blocked. The tensile force on the belt webbing 16 is thereafter transmitted substantially undiminished between the end fitting 430 and the vehicle body 18.

From the above description of the invention, those skilled in the art will perceive improvements, changes and modifications in the invention. For example, the controller 300 can be programmed to actuate the releasable bolts 218 and 264 at occupant weight cutoff points other than 130 pounds and 180 pounds. Also, more than two crushable energy absorbing members can be used to provide a tailorable energy management device with more than three stages. Such improvements, changes and modifications within the skill of the art are intended to be covered by the appended claims.

Having described the invention, we claim:

1. A vehicle safety apparatus comprising:

a length of seat belt webbing for restraining a vehicle occupant;

a seat belt webbing retractor having a spool on which said seat belt webbing is wound, said seat belt webbing extending from said retractor in a first direction;

a crush plate secured to said retractor, said crush plate comprising means for crushing material;

means for mounting said retractor on the vehicle for movement, including guide means for constraining movement of said retractor and said crush plate to only said first direction; and a crushable energy absorbing material disposed in the path of movement of said crush plate and remaining in the path of movement of said crush plate during crushing by said crush plate for controlling movement of said retractor in the first direction.

2. A vehicle safety apparatus as set forth in claim 1 wherein said crushable energy absorbing material comprises a honeycomb.

3. A vehicle safety apparatus as set forth in claim 2 wherein said crush plate has a first surface in abutting engagement with said honeycomb, said honeycomb comprising a plurality of layers of material defining cells extending parallel to the first direction, movement of said retractor in the first direction acting to crush simultaneously said layers of material defining said cells.

4. A vehicle safety apparatus as set forth in claim 2 wherein said honeycomb is made of metal.

5. A vehicle safety apparatus as set forth in claim 2 wherein said honeycomb is made of plastic.

6. A vehicle safety apparatus as set forth in claim 1 wherein said means for mounting said retractor on the vehicle comprises a mounting bracket having an attachment portion for attaching said retractor and said crush plate to the vehicle and said guide means having a guide portion engageable with said retractor for guiding movement of said retractor, said crush plate extending in a direction transverse to the first direction, said mounting bracket having an end wall extending generally parallel to said crush plate and spaced apart from said crush plate in the first direction.

7. A vehicle safety apparatus as set forth in claim 1 comprising a plurality of walls defining a chamber, said crushable energy absorbing material being disposed in said chamber, said plurality of walls including first and second opposite end walls of said chamber and at least one side wall, said first end wall comprising a stop member spaced apart from said crush plate in the first direction and said second end wall comprising said crush plate, said crush plate being supported for sliding movement along said at least one side wall in a direction toward said stop member upon movement of said retractor in the first direction.

8. A vehicle safety apparatus as set forth in claim 7 wherein said crushable energy absorbing material comprises a honeycomb.

9. A vehicle safety apparatus as set forth in claim 1 including sensing means for sensing a characteristic of the vehicle occupant and control means for controlling the resistance provided by said crushable energy absorbing material in response to the sensed characteristic of the vehicle occupant.

10. A vehicle safety apparatus as set forth in claim 9 wherein said crushable energy absorbing material includes first and second discrete honeycombs and wherein said control means comprises means for selectively crushing one or both of said first and second honeycombs in response to the sensed characteristic of the vehicle occupant.

11. A vehicle safety apparatus as set forth in claim 9 wherein said crushable energy absorbing material includes first and second discrete honeycombs and wherein said control means comprises means for selectively crushing one or both of said first and second honeycombs in response to vehicle crash severity.

12. A vehicle safety apparatus comprising:

a length of seat belt webbing for restraining a vehicle occupant;

a seat belt webbing retractor having a spool on which said seat belt webbing is wound;

a crush plate secured to said retractor;

means for mounting said retractor on the vehicle for movement of said retractor and said crush plate in a first direction; p1 a crushable energy absorbing material disposed in the path of movement of said crush plate for controlling movement of said retractor in the first direction;

sensing means for sensing a characteristic of the vehicle occupant; and control means for controlling the resistance provided by said crushable energy absorbing material in response to the sensed characteristic of the vehicle occupant;

said crushable energy absorbing material including first and second discrete honeycombs, said control means comprises means for selectively crushing one or both of said first and second honeycombs in response to the sensed characteristic of the vehicle occupant, said crush plate including a first crush plate member for crushing said first honeycomb and a second crush plate member for crushing said honeycomb, and said control means comprising means for selectively interconnecting said second crush plate member for movement with said first crush plate member for crushing both said first and second honeycombs.

13. A vehicle safety apparatus comprising:

a length of seat belt webbing for restraining an occupant of the vehicle;

means for defining a stop member adapted to be fixed in position on the vehicle;

means for defining a movable mechanism that is movable with the seat belt webbing in a first direction toward said stop member;

a crushable energy absorbing material disposed in the path of movement of said movable mechanism for controlling said movement of said movable mechanism in the first direction by providing a resistance to said movement;

means for sensing a characteristic of the vehicle and/or the vehicle occupant; and means for controlling the resistance provided by said crushable energy absorbing material in response to the sensed characteristic.

14. A vehicle safety apparatus as set forth in claim 13 wherein said crushable energy absorbing material includes first and second discrete honeycombs and wherein said means for controlling the resistance provided by said crushable energy absorbing material comprises means for selectively crushing one or both of said first and second honeycombs in response to the sensed characteristic.

15. A vehicle safety apparatus as set forth in claim 14 wherein said movable mechanism comprises (a) a first crush plate spaced apart from said stop member by a first distance for crushing said first honeycomb and (b) a second crush plate spaced apart from said stop member by a second distance less than the first distance for crushing said second honeycomb, and said means for controlling comprises means for selectively interconnecting said second crush plate for movement with said first crush plate for crushing both said first and second honeycombs.

16. An apparatus according to claim 13 wherein said means for sensing comprises means for sensing the weight of the vehicle occupant.

17. An apparatus according to claim 13 wherein said means for sensing comprises means for sensing the position of the vehicle occupant.

18. An apparatus according to claim 13 wherein said means for sensing comprises means for sensing the vehicle crash severity.

19. A vehicle safety apparatus comprising:

a length of seat belt webbing for restraining an occupant of the vehicle;

a member adapted to be fixed in position on the vehicle;

a mechanism connected for movement with said webbing; and energy absorbing means acting between said member and said mechanism for enabling controlled movement of said mechanism relative to said member due to tension applied to said belt webbing by the vehicle occupant, said energy absorbing means including:

means for defining a first energy absorbing device that is actuatable to resist movement of said mechanism relative to said member by a first force;

means for defining a second energy absorbing device that is actuatable to resist movement of said mechanism relative to said member by a second force greater than said first force;

means for sensing a characteristic of the vehicle occupant; and control means responsive to the sensed characteristic of the vehicle occupant for selectively actuating said first and second energy absorbing devices.

20. A vehicle safety apparatus as set forth in claim 19 wherein said first energy absorbing device comprises a first crushable member interposed between said member and said mechanism and said second energy absorbing device comprises a second crushable member interposed between said member and said mechanism.

21. A vehicle safety apparatus as set forth in claim 20 wherein each one of said first and second crushable members comprises a honeycomb.

22. A vehicle safety apparatus as set forth in claim 21 wherein said mechanism comprises a first crush plate movable relative to said member to crush said first honeycomb and a second crush plate movable relative to said member to crush said second honeycomb.

23. A vehicle safety apparatus as set forth in claim 22 wherein at least one of said first and second honeycombs is made of plastic.

24. A vehicle safety apparatus as set forth in claim 22 wherein said means for sensing a characteristic of the vehicle occupant comprises means for sensing the weight of the vehicle occupant.

25. A vehicle safety apparatus as set forth in claim 24 wherein said control means for selectively actuating said first and second energy absorbing devices comprises means for enabling movement of said first crush plate relative to said second crush plate to crush only said first honeycomb when said sensing means senses a first vehicle occupant weight and means for interconnecting said second crush plate for movement with said first crush plate relative to said first member to crush both said first and second honeycombs when said sensing means senses a second vehicle occupant weight.

* * * * *

UNITED STATES PATENT AND TRADEMARK OFFICE
CERTIFICATE OF CORRECTION

PATENT NO. : 5,544,918
DATED : August 13, 1996
INVENTOR(S) : SEAT BELT WEBBING ENERGY MANAGEMENT DEVICE It is certified that error appears in the above-indentified patent and that said Letters Patent is hereby corrected as shown below:

Column 14, line 41, after "direction;" delete --p1-- and start a new paragraph.

Signed and Sealed this

Twenty-seventh Day of May, 1997

Attest:

BRUCE LEHMAN

Attesting Officer

Commissioner of Patents and Trademarks